US008024520B2

(12) United States Patent
Wardensky et al.

(10) Patent No.: US 8,024,520 B2
(45) Date of Patent: Sep. 20, 2011

(54) MAINTAINING DATA STORED IN A MEMORY MODULE WHEN TRANSFERRING THE MEMORY MODULE FROM A FIRST CONTROLLER TO A SECOND CONTROLLER

(75) Inventors: Luke L. Wardensky, Houston, TX (US); Lindall W. Gay, Jr., Houston, TX (US); Everett R. Salinas, Pasadena, TX (US); Jeffery M. Giardina, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 598 days.

(21) Appl. No.: 11/903,384

(22) Filed: Sep. 21, 2007

(65) Prior Publication Data

US 2009/0083487 A1 Mar. 26, 2009

(51) Int. Cl.
*G06F 13/00* (2006.01)
(52) U.S. Cl. ......... 711/115; 710/302; 711/105; 713/300
(58) Field of Classification Search .................. 711/115, 711/105; 710/302; 713/300
See application file for complete search history.

(56) References Cited

U.S. PATENT DOCUMENTS

| | | | | |
|---|---|---|---|---|
| 6,295,565 | B1 | 9/2001 | Lee | |
| 6,732,274 | B1 * | 5/2004 | Charron | 713/193 |
| 6,763,398 | B2 | 7/2004 | Brant et al. | |
| 6,816,981 | B2 | 11/2004 | Morita et al. | |
| 7,136,962 | B2 | 11/2006 | Sugimoto | |
| 2001/0049799 | A1 | 12/2001 | Morita et al. | |
| 2002/0194440 | A1 * | 12/2002 | Ghosh et al. | 711/156 |
| 2003/0177294 | A1 * | 9/2003 | Russell | 710/62 |
| 2004/0225832 | A1 * | 11/2004 | Huang | 711/105 |
| 2005/0268035 | A1 | 12/2005 | Chang et al. | |
| 2005/0283648 | A1 | 12/2005 | Ashmore | |
| 2006/0015683 | A1 | 1/2006 | Ashmore et al. | |
| 2006/0106982 | A1 | 5/2006 | Ashmore et al. | |
| 2006/0143506 | A1 | 6/2006 | Whitt et al. | |
| 2006/0174156 | A1 | 8/2006 | Balasubramanian | |
| 2006/0212651 | A1 | 9/2006 | Ashmore | |
| 2007/0033431 | A1 | 2/2007 | Pecone et al. | |
| 2007/0033433 | A1 | 2/2007 | Pecone et al. | |

* cited by examiner

*Primary Examiner* — Jae U Yu

(57) ABSTRACT

To transfer a memory module between controllers, an external power source is connected to a memory module mounted to a first controller. The memory module is removed from the first controller with the external power source connected to the memory module to maintain data stored in volatile memory of the memory module. The memory module is mounted to a second controller.

16 Claims, 4 Drawing Sheets

MAINTAINING DATA STORED IN A MEMORY MODULE WHEN TRANSFERRING THE MEMORY MODULE FROM A FIRST CONTROLLER TO A SECOND CONTROLLER

BACKGROUND

Memory devices are used in many different types of systems, including computers, storage systems, portable devices, and so forth. Certain types of memory devices are volatile; in other words, such memory devices when disconnected electrically from a power source lose data stored in the memory devices.

In one example implementation, volatile memory devices can be provided on storage controllers such as RAID (redundant arrays of inexpensive disks) controllers in storage array systems for use as cache memory. The cache memory used by a storage controller provides increased read and write throughput, since the cache memory typically has faster access speeds than persistent storage devices in storage systems.

For example, in response to a read request from a host, if the requested data happens to be in the cache memory, then the read request can be satisfied relatively quickly. Similarly, posted write or write caching operations can be performed in which data is written to the cache memory in response to a write request, and the host is notified that the write request is complete once the data is written to the cache memory, even though the storage controller has not yet written the data to persistent storage.

However, an issue associated with using cache memory is that if the storage controller were to fail, then data contained in the cache memory of the failed storage controller may be lost. This is undesirable in scenarios where write data in the cache memory has not yet been written back to the persistent storage.

Conventionally, to preserve data in cache memory devices of a failed storage controller, cache memory devices are transferred (physically moved) from the failed storage controller to a functional storage controller. During the transfer, batteries or capacitors can be provided on the cache memory devices to allow the cache memory devices to maintain stored data during transfer from the failed storage controller to the functional storage controller. An issue associated with using batteries or capacitors on cache memory devices is that batteries or capacitors can take up valuable circuit board space. Moreover, batteries have a finite shelf life, such that older batteries may not function properly after some amount of time, and would have to be disposed. Also, because batteries contain hazardous materials, they are subject to special disposal procedures. Moreover, charging and/or monitoring circuits often have to be provided on cache memory devices if batteries are used, which also take up valuable circuit board space. In addition, since batteries or capacitors provide power for only a small amount of time, data in cache memory devices may still be lost if the transfer of the cache memory devices is not completed prior to expiration of the batteries or capacitors.

BRIEF DESCRIPTION OF THE DRAWINGS

Some embodiments of the invention are described, by way of example, with respect to the following figures.

DETAILED DESCRIPTION

In accordance with some embodiments, a memory transfer module (also referred to as a "transfer module") is provided to enable provision of power to a memory module as the memory module is transferred (physically moved) from a first controller to a second controller. A "memory module" can refer to a single memory device (e.g., memory chip) or to an assembly of memory devices (e.g., single inline memory module, double inline memory module, etc.). A memory device refers to any storage device that is able to store data.

The provision of power to the memory module during transfer of the memory module between the controllers enables data stored in volatile memory device(s) of the memory module to be maintained such that the data is not lost due to loss of power. The transfer module receives power from an external power source, which can be a host system such as a computer (e.g., portable computer, desktop computer, etc.), an AC adapter (which can be plugged into an AC wall outlet to produce a DC output), an external battery pack, and so forth. The transfer module can be removably attached to the memory module to perform the transfer between controllers, or alternatively, the transfer module can be permanently affixed to (e.g., integrated with) the memory module, with a cable removably connected to the transfer module to supply the power during memory module transfer between controllers.

More generally, some embodiments of the invention provide a technique of supplying an external source of power to a memory module to maintain data contained in volatile memory device(s) of the memory module during transfer of the memory module between different controllers, where the different controllers can include a first failed controller and a second controller that is functioning properly.

In some implementations, the controllers can be storage controllers, such as RAID controllers, that can be part of a storage array system. Alternatively, the controllers can be part of other types of systems, such as computer systems (e.g., server computers, client computers, etc.), portable devices (e.g., personal digital assistants, mobile telephones, etc.), and so forth. Thus, the term "controller," as used herein, refers to any type of product or device that uses a memory module that contains at least one volatile memory device, such that the transfer of the memory module from one controller to another controller would benefit from use of the transfer module according to some embodiments to maintain data contained in the at least one volatile memory device.

Figure 1A:
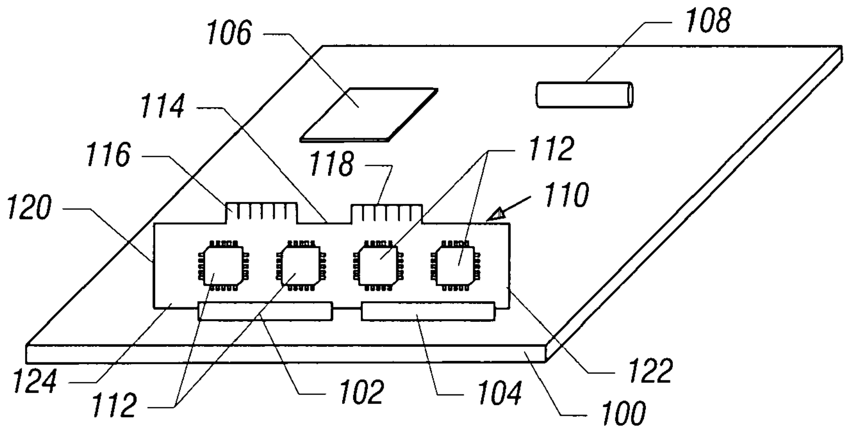
FIG. 1A illustrates a circuit board on which is mounted a memory module for use with a transfer module according to an embodiment.
Figure 1B:
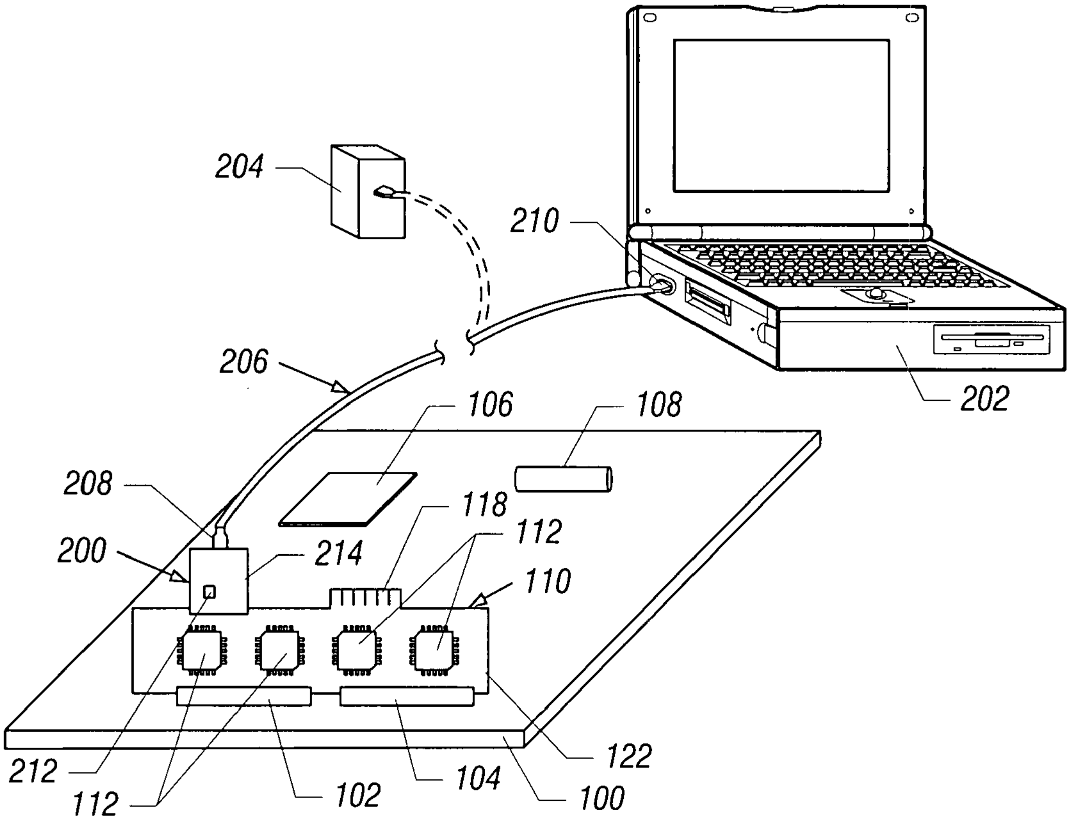
FIG. 1B illustrates the circuit board of FIG. 1A in which the memory module has been engaged with the transfer module according to an embodiment.

FIGS. 1A and 1B illustrate one specific implementation in accordance with an embodiment. Note that in other implementations, other types of devices can be used. FIG. 1A shows an example portion of a controller (e.g., storage controller or other type of controller), which includes a main circuit board 100 on which are provided connectors 102, 104, and one or more electronic devices 106. In a different example, different numbers of connectors can be provided in the circuit board 100. Also depicted as being provided on the circuit board 100 is a battery 108. Note that the battery 108 can instead be separate from the circuit board 100, but is otherwise part of the controller of which the circuit board 100 is part.

A memory module 110 is mounted to the connectors 102, 104, where the memory modules 110 include multiple volatile memory devices 112, which can be, as examples, dynamic random access memory (DRAMs), synchronous DRAMs (SDRAMs), and so forth. The volatile memory devices 112 when disconnected from the main power source (which can either be the battery 108 or the main power supply of the controller) of the controller, will lose data stored in the memory devices 112.

A first side 114 of the memory module is provided with edge connectors 116, 118. Although two edge connectors 116, 118 are provided on the side 114 of the memory module 110, it is noted that a smaller number or a larger number of edge connectors can be provided. Also, alternatively, instead of being provided on the side 114, the edge connector(s) can be provided on the left (120) or right (122) ends of the memory module 110. The lower side 124 of the memory module 110 is also provided with edge connectors to mate with the connectors 102, 104 of the circuit board 100. Such edge connectors are depicted as edge connectors 126, 128 in FIG. 2.

Either one of the edge connectors 116, 118 of the memory module 110 can be used to removably connect to a transfer module 200, as depicted in FIG. 1B. The transfer module 200 includes a mechanism to supply power (from an external power source) to the memory module 110 through the edge connector 116 or 118.

As depicted in FIG. 1B, the external power source can be a computer 202, an AC adapter 204, or some other external power source, such as a battery pack, or even a controller (e.g., storage controller). A cable 206 is connected between the external power source and the transfer module 200. In some embodiments, the cable 206 can be a USB (Universal Serial Bus) cable, with a mini-USB connector 208 for connection to the transfer module 200, and a regular USB connector 210 for connection to the external power source (e.g., computer 202 or AC adapter 204).

As further depicted in FIG. 1B, the transfer module 200 has an indicator 212 (which can be an LED indicator or some other type of indicator, for example) to indicate that the transfer module 200 is powered. This indicator 212 gives a user feedback that power is being provided to the memory module 110 by the transfer module 200.

Also, the transfer module 200 has an external housing 214 that is formed of an electrically insulative material to protect users from being shocked by power on the transfer module 200. The external housing 214 can be made of plastic or some other electrically insulative material. The external housing 214 can also be provided to attach the transfer module 200 to the memory module 110. In one implementation, the transfer module 200 can be implemented with a circuit board as one or more devices arranged on the circuit board. The external housing 214 can surround the circuit board of the transfer module 200.

Figure 2:
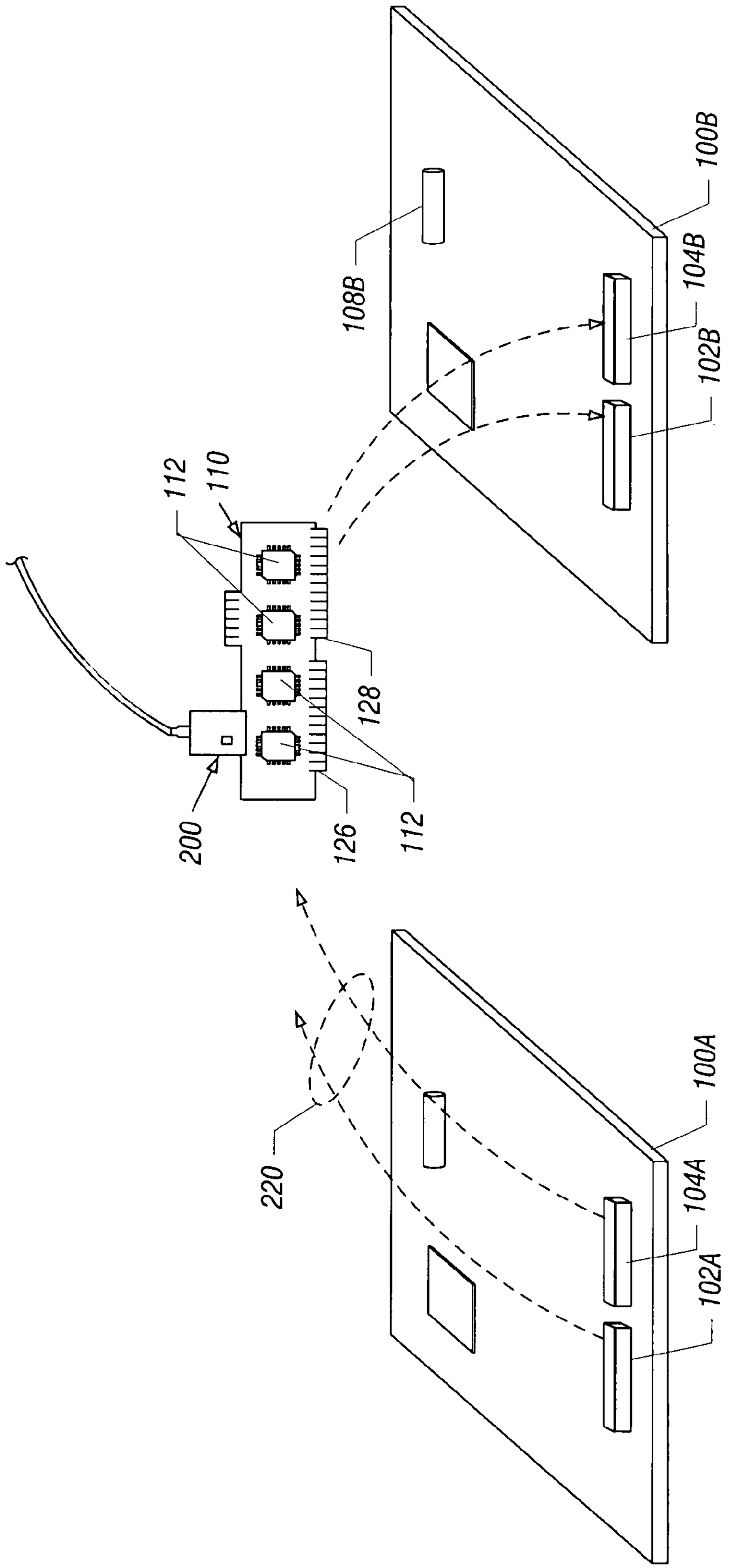
FIG. 2 illustrates transfer of the memory module from a first controller to a second controller, with the transfer module connected to the memory module during the transfer, in accordance with an embodiment.

FIG. 2 shows the transfer of the memory module 110 from a first circuit board 100A of a first controller to a second circuit board 100B of a second controller, where the first controller may be a defective or failed controller, and the second controller is a functioning controller. After the transfer module 200 is connected to the memory module 110 to supply power to the volatile memory devices 112 on the memory module 110, the memory module 110 can be unplugged from the connectors 102A, 104A of the circuit board 100A and moved to the circuit board 100B for plugging into the connectors 102B, 104B of the circuit board 100B. Note that the second controller can be associated with a battery 108B (or another source) that can supply power to the memory module 110 once the memory module 110 is mounted to the circuit board 100B. In this case, since power is supplied from the battery 108B to the memory module 110 on the circuit board 100B, the volatile memory devices 112 on the memory module 110 can be powered by the battery 108B of the second controller. As a result, the transfer module 200 can be disengaged from the memory module 110, with the data in the volatile memory devices 112 continued to be maintained due to power supplied by the battery 108B.

Instead of providing the battery 108B in the second controller, note that the second controller can actually be powered on (e.g., the second controller is operatively mounted to a storage system that is on), in which case, the main power supply of the second controller can provide power to the memory module 110 for maintaining data in the volatile memory devices 112.

By using the transfer module 200 according to some embodiments, trapped data (e.g., posted write data or write cache data that has not yet been written to persistent storage) that is stored in the volatile memory devices 112 of the memory module 110 that was originally mounted on a failed first controller can be maintained during transfer of the memory module from the failed first controller to a functional second controller. By using the transfer module 200 that is powered from an external power source, issues associated with providing batteries or capacitors on memory modules to maintain data in volatile memory devices can be avoided in some implementations. Such issues include the relative limited amount of power that can be provided by a battery or capacitor on the memory module. A further issue associated with using a battery on a memory module is that such a battery may have to be replaced after some amount of time. Moreover, due to elevated temperatures that may be present during operation of a controller, the battery can pose a safety hazard since the battery may explode at high temperatures. Thus, the transfer module according to some embodiments provides an environmentally friendly, relatively low cost of providing power to a memory module that is being transferred.

The above transfer module 200 is removably attached to a memory module. A benefit of using such a transfer module is that the same transfer module can be used with many different memory modules to enable transfer of such memory modules from failed controllers to functional controllers.

Figure 3A:
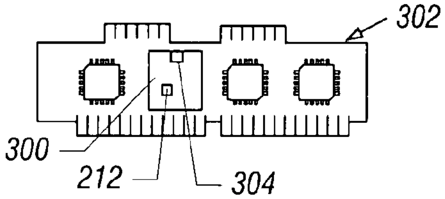
FIGS. 3A and 3B illustrate a circuit board according to another embodiment that integrates a transfer module.
Figure 3B:
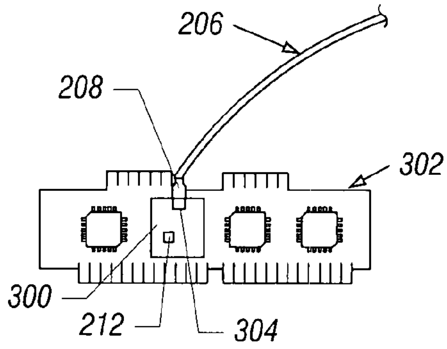

In another embodiment, instead of using a removably attachable transfer module 200, the circuitry associated with the transfer module 200 can be permanently affixed to (e.g., integrated with) the memory module, as depicted in FIGS. 3A and 3B. As shown in FIG. 3A, this different embodiment of a transfer module 300 is mounted on a memory module 302. The transfer module 300 can include identical circuitry as the transfer module 200, except that the transfer module 300 may not include the external housing 214 that is present on the transfer module 200. The transfer module 300 has a port 304, such as a mini-USB port, to receive a mini-USB connector of the USB cable 206, as depicted in FIG. 3B. In other implementations, other types of cables can be used to connect to the port 304 of the transfer module 300.

Thus, in operation, a cable can simply be connected to the transfer module 300 mounted to the memory module 302 to enable transfer of the memory module 302 from a failed first controller to a functional second controller while maintaining data stored in volatile memory devices on the memory module 302. A benefit of using the arrangement of FIGS. 3A-3B is that a user does not have to handle a discrete transfer module, such as the transfer module 200 of FIGS. 1B and 2.

Figure 4:
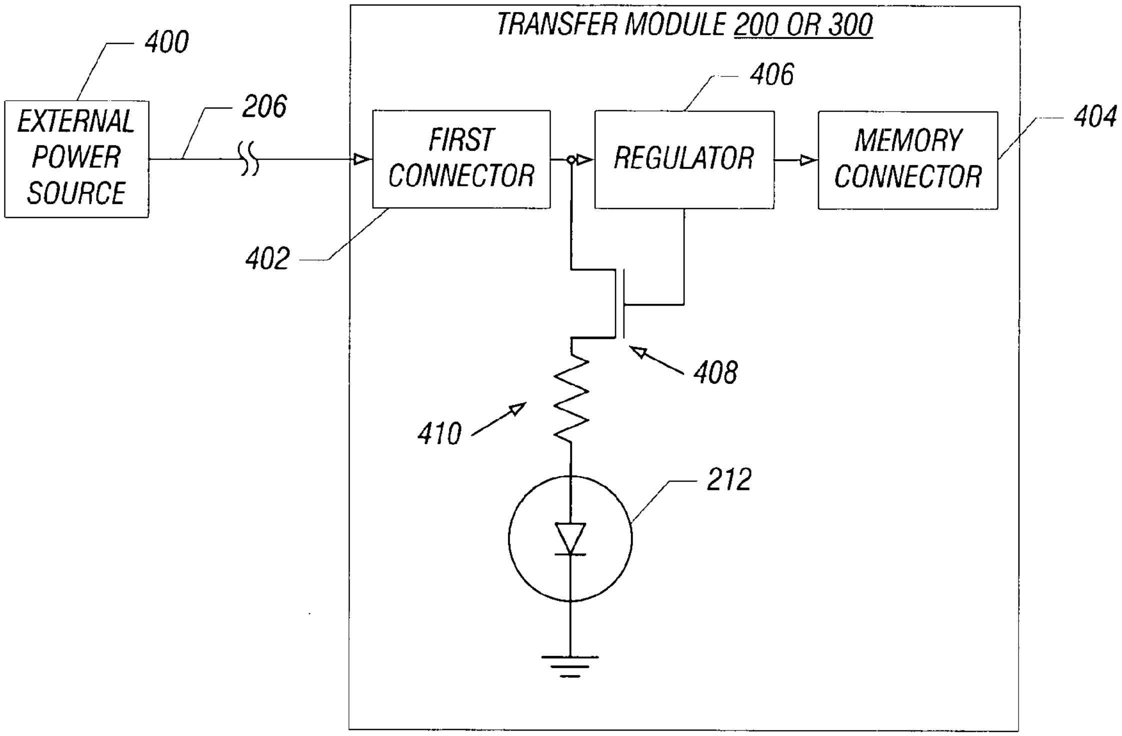
FIG. 4 is a block diagram of components of the transfer module according to an embodiment.

FIG. 4 shows components in the transfer module 200 or 300 that is connected over a cable (e.g., 206) to an external power source 400 (e.g., computer 202, AC adapter 204, etc.).

The transfer module 200 or 300 includes a first connector 402 to enable connection to the cable 206. The first connector 402 is connected to a regulator or converter 406 on the transfer module 200 or 300, where the regulator 406 can be a DC-DC regulator to convert a first DC voltage to a second DC voltage. For example, the external power source 400 can provide a 5V power voltage to the transfer module 200 or 300, which is communicated to the regulator through the first connector 402. The regulator 406 converts the 5V power voltage to a lower power voltage, e.g., 1.8V power voltage, which is supplied to a memory connector 404 that is for connection to memory devices on the memory module 110 or 302. Instead of using a DC-DC converter, a high-precision voltage divider can be used instead. The memory connector 404 of the transfer module can be a connector to connect to the edge connector 116 or 118 of the memory module 110, as depicted in FIGS. 1A and 1B. Alternatively, the memory connector 404 can be a connector to enable connection of the transfer module signals to traces on the memory module 302 that are connected to memory devices on the memory module 302.

The transfer module 200 or 300 also includes a switch 408 (which can be in the form of a transistor) that is controlled by an output of the regulator 406. When the transfer module 200 or 300 is connected to the external power source 400, and the external power source 400 is supplying power to the regulator 406, the regulator turns on (activates) the switch 408 to allow the voltage received by the first connector 402 to be provided through the switch 408 to the LED 212 through a current-limiting resistor 412. This causes the LED 212 to turn on to produce a visual indicator.

Although FIG. 4 has depicted an embodiment of the transfer module 200 or 300, note that in different implementations, other arrangements of circuitry can be used.

Figure 5:
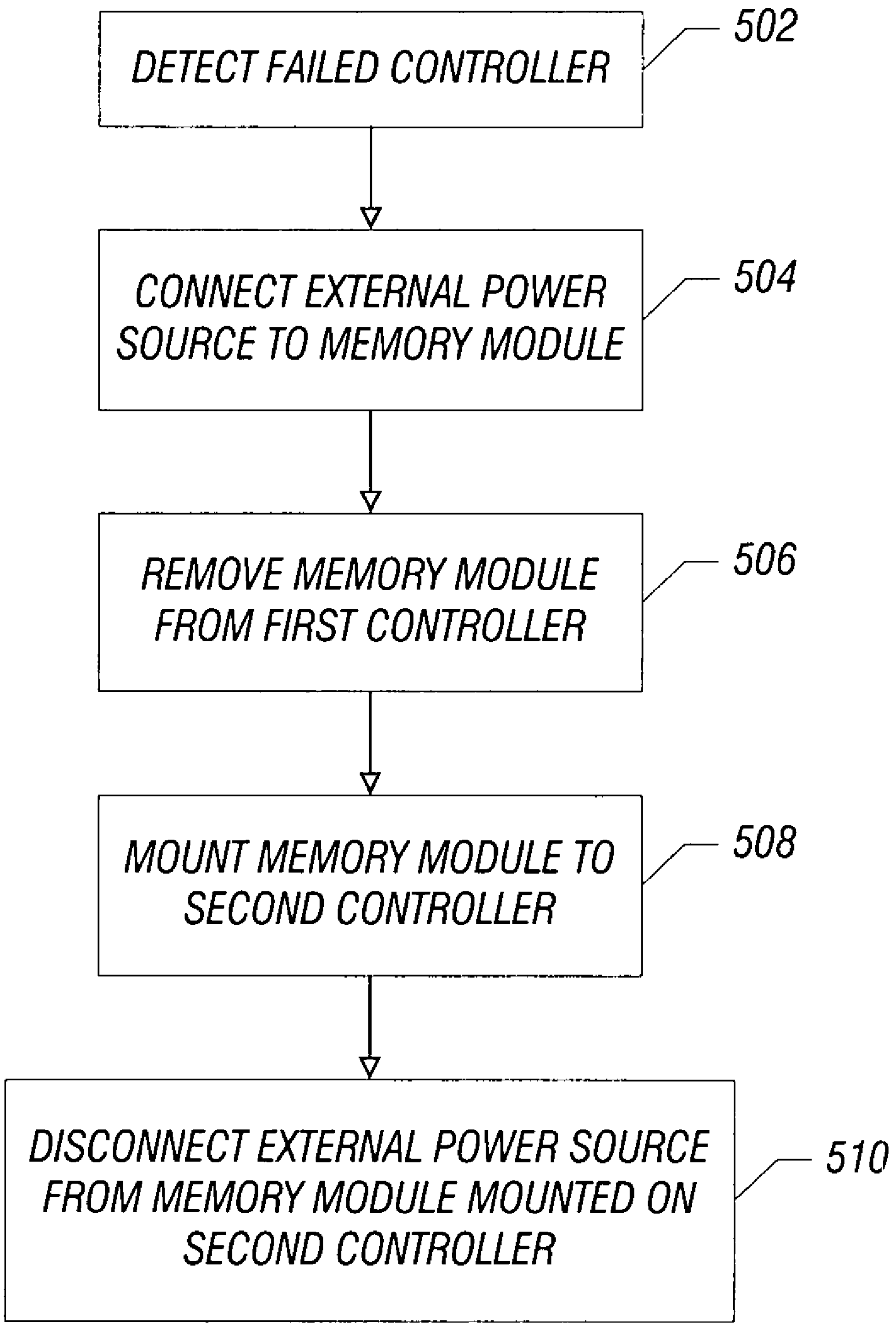
FIG. 5 is a flow diagram of a process of transferring a memory module, according to an embodiment.

FIG. 5 illustrates a general procedure according to an embodiment. A failed first controller is detected (at 502). Such detection can be based on various indicators, such as an alarm issued by a system that includes the first controller, a user noticing that the first controller is inaccessible or is outputting erroneous data, and so forth. In response to detecting the failed first controller, an external power source is connected (at 504) by a user to the memory module that is mounted on the failed first controller. Note that the failed first controller may continue to have power even though it is failed, or alternatively, the first controller can include a battery (such as battery 108A in FIG. 2), that can supply power to the memory module even though the first controller is failed. This allows data in the volatile memory devices of the memory module to be maintained even though the first controller has failed.

However, by connecting the external power source to the memory module, a second source of power is provided to the memory module to maintain the data in the volatile memory devices of the memory module. Once the user detects, based on the indicator 212 (FIGS. 1B, 3B) that power is available on the transfer module that is electrically connected to the memory modules, the user next removes (at 506) the memory module from the first controller. Note that power is supplied to the memory module from the external power source to the memory module through the transfer module.

Next, the memory module is mounted (at 508) to the second controller. After confirming that power is supplied by the second controller to the mounted memory module, the external power source to the memory module can be disengaged (at 510), such as by unplugging the USB cable 206 from the transfer module 300 or by removing the transfer module 200 from the memory module 110.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of transferring a memory module between controllers, comprising:
- connecting an external power source through a transfer module to a memory module mounted to a first controller, wherein the transfer module is connected to the memory module while the memory module is mounted to the first controller;
- removing the memory module from the first controller with the external power source connected through the transfer module to the memory module to maintain data stored in volatile memory of the memory module;
- mounting the memory module to a second controller while the external power source remains connected through the transfer module to the memory module; and
- disconnecting the external power source from the memory module after mounting the memory module to the second controller, wherein disconnecting the external power source from the memory module comprises removing the transfer module from the memory module.

2. The method of claim 1, wherein the transfer module includes circuitry that couples the external power source to the volatile memory of the memory module.

3. The method of claim 1, wherein connecting the external power source to the memory module comprises connecting power provided by a Universal Serial Bus (USB) cable to the memory module.

4. The method of claim 3, further comprising attaching the USB cable to at least one of a host, an AC adapter, and an external battery pack.

5. The method of claim 1, further comprising:
- providing an indication by an indicator on the transfer module that the transfer module connected to the memory module is powered by the external power source.

6. The method of claim 5, wherein providing the indication comprises providing a visual indication by a visual indicator on the transfer module that is removably connected to the memory module.

7. The method of claim 1, wherein the memory module comprises a cache memory module, and wherein the first and second controllers comprise first and second storage controllers,
- wherein removing the memory module from the first controller comprises removing the cache memory module from the first storage controller, and wherein mounting the memory module to the second controller comprises mounting the cache memory module to the second storage controller.

8. The method of claim 1, wherein the first controller has a first power source, the method further comprising the first power source providing power to the memory module while the memory module is mounted to the first controller.

9. The method of claim 8, wherein the second controller comprises a second power source, the method further comprising:

providing power from the second power source to the memory module when the memory module is mounted to the second controller.

10. The method of claim 9, further comprising the second power source of the second controller continuing to provide power to the memory module after disconnecting the external power source from the memory module once the memory module has been mounted to the second controller.

11. An apparatus comprising:

a transfer module having a first connector for connection to an external power source, wherein the transfer module further includes a circuit to receive power from the external power source and to convert the power from the external power source to a power voltage, the transfer module further including a second connector for connecting the power voltage provided by the circuit to volatile memory of a memory module to enable transfer of the memory module between different controllers, wherein the second connector is removably connectable to a corresponding connector of the memory module, wherein the transfer module is connectable to the memory module while the memory module is connected to a first controller and as the memory module is moved from the first controller to mount to a second controller, and the transfer module is removable from the memory module after the memory module has been removed from the first controller and mounted to the second controller.

12. The apparatus of claim 11, wherein the transfer module further comprises a visual indicator to indicate that the transfer module is connected to the external power source.

13. The apparatus of claim 11, wherein the circuit comprises one of a DC-DC converter and a voltage divider.

14. The apparatus of claim 11, wherein the first connector comprises a Universal Serial Bus (USB) connector for receiving a USB cable, wherein the external power source is provided over the USB cable.

15. A system comprising:

a first controller and a second controller;

a memory module removably mounted on the first controller, wherein the memory module comprises volatile memory; and a transfer module to receive an external power source and to provide power to the volatile memory as the memory module is transferred from the first controller by disconnecting the memory module from the first controller and mounting the memory module to the second controller, wherein the transfer module is connectable to the memory module while the memory module is mounted to the first controller and as the memory module is moved from the first controller to mount to the second controller, wherein the transfer module is configured to continue to provide the power from the external power source to the memory module as the memory module is being mounted to the second controller, and wherein the transfer module is removable from the memory module after the memory module has been removed from the first controller and mounted to the second controller.

16. The system of claim 15, wherein the transfer module is configured to receive the external power source over a Universal Serial Bus (USB) cable.

* * * * *

UNITED STATES PATENT AND TRADEMARK OFFICE

CERTIFICATE OF CORRECTION

PATENT NO. : 8,024,520 B2
APPLICATION NO. : 11/903384
DATED : September 20, 2011
INVENTOR(S) : Luke L. Wardensky et al.

It is certified that error appears in the above-identified patent and that said Letters Patent is hereby corrected as shown below:

On the Title page, in Item (75), Inventors, in column 1, line 2, delete “Lindall W. Gay, Jr.,” and insert -- Lindell W. Gay, Jr., --, therefor.

Signed and Sealed this
Seventeenth Day of April, 2012

David J. Kappos
*Director of the United States Patent and Trademark Office*